US008682868B2

(12) United States Patent
Ghuge et al.

(10) Patent No.: US 8,682,868 B2
(45) Date of Patent: Mar. 25, 2014

(54) REMOVAL OF DATA REMANENCE IN DEDUPLICATED STORAGE CLOUDS

(75) Inventors: Deepak R. Ghuge, Ahmednagar (IN);
Bhushan P. Jain, Maharashtra (IN);
Sandeep R. Patil, Elmsford, NY (US);
Sri Ramanathan, Lutz, FL (US);
Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 13/309,977

(22) Filed: Dec. 2, 2011

(65) Prior Publication Data

US 2013/0144845 A1    Jun. 6, 2013

(51) Int. Cl.
*G06F 7/00* (2006.01)
*G06F 17/30* (2006.01)

(52) U.S. Cl.
USPC .......................................... 707/692; 707/803

(58) Field of Classification Search
USPC ....................................................... 707/692
See application file for complete search history.

(56) References Cited

U.S. PATENT DOCUMENTS

| 7,272,610 | B2 * | 9/2007 | Torres ................................. 1/1 |
| 7,859,571 | B1 * | 12/2010 | Brown et al. ............... 348/211.3 |
| 8,190,835 | B1 * | 5/2012 | Yueh .............................. 711/162 |
| 2010/0082558 | A1 | 4/2010 | Anglin et al. |
| 2010/0094813 | A1 | 4/2010 | Brueggemann et al. |
| 2010/0161554 | A1 * | 6/2010 | Datuashvili et al. .......... 707/610 |
| 2010/0235333 | A1 | 9/2010 | Bates et al. |
| 2010/0306175 | A1 | 12/2010 | Johnson et al. |
| 2010/0306176 | A1 * | 12/2010 | Johnson et al. ............... 707/664 |
| 2010/0306180 | A1 | 12/2010 | Johnson et al. |
| 2010/0306283 | A1 * | 12/2010 | Johnson et al. ............... 707/803 |
| 2011/0258398 | A1 * | 10/2011 | Saliba et al. .................. 711/154 |
| 2011/0271010 | A1 * | 11/2011 | Kenchammana et al. .... 709/244 |
| 2011/0282743 | A1 * | 11/2011 | Gerdes et al. ............. 705/14.55 |
| 2012/0011101 | A1 * | 1/2012 | Fang et al. .................... 707/654 |
| 2012/0179653 | A1 * | 7/2012 | Araki et al. ................... 707/634 |
| 2012/0209820 | A1 * | 8/2012 | Patterson ..................... 707/692 |
| 2012/0257626 | A1 * | 10/2012 | McGhee et al. ............. 370/392 |
| 2012/0330904 | A1 * | 12/2012 | Factor et al. ................. 707/692 |

FOREIGN PATENT DOCUMENTS

| CN | 101079034 | 11/2007 |
| CN | 101582076 | 11/2009 |

OTHER PUBLICATIONS

Danny Harnik, "Side Chennels in Cloud Services, the Case of Deduplication in Cloud Storage", Apr. 17, 2011.*
Mark W. Storer, "Secure Data Deduplication", Oct. 31, 2008.*

(Continued)

*Primary Examiner* — Binh V Ho
(74) *Attorney, Agent, or Firm* — Matthew Chung; Roberts Mlotkowski Safran & Cole, P.C.

(57) ABSTRACT

A method implemented in a computer infrastructure including a combination of hardware and software includes receiving from a local computing device a request to securely delete a file. The method also includes determining the file is deduplicated. The method further includes determining one of: the file is referred to by at least one other file, and the file is not referred to by another file. The method additionally includes securely deleting links associating the file with the local computing device without deleting the file when the file is referred to by at least one other file. The method also includes securely deleting the file when the file is not referred to by another file.

3 Claims, 6 Drawing Sheets

(56) References Cited

OTHER PUBLICATIONS

"Greener method for Data Deduplication with Secure Data Remanence", http://priorartdatabase.com/IPCOM/000198559, Aug. 9, 2010, 4 pages.

Julia, "Security—Its in our DNA", http://blog.oxygencloud.com/2011/04/22/security-its-in-our-dna/, Oxygen Cloud's Blog, Apr. 22, 2011, pp. 1-2.

Carpenter, K. et al, "Understanding Deduplication", http://www.nysforum.org/committees/emergingtechnologies/documents/NYS_Forum_PPT_Deduplication%20101.pdf, The NYS Forum, Emerging Technologies, Dec. 2, 2011, 11 pages.

Jaspreet, "Understanding Data Deduplication", http://blog.druva.com/2009/01/09/understanding-data-deduplication/, Druva Software, Jan. 9, 2009, pp. 1-11.

Luboja, E., "Data Domain Introduces Secure Data Shredding for Deduplication Storage", http://www.datadomain.com/news/press_rel_051809.html, EMC2 data domain, May 18, 2009, pp. 1-2.

Mell, P., "The NIST Definition of Cloud Computing", National Institute of Standards of Technology, Information Technology Laboratory, Ver 15, Oct. 7, 2009, pp. 1-2.

International Search Report for PCT Application No. PCT/IB2012/056482, dated dated Apr. 25, 2013; 6 pages.

Written Opinion of the International Searching Authority for PCT Application No. PCT/IB2012/056482, dated Apr. 25, 2013; 5 pages.

\* cited by examiner

REMOVAL OF DATA REMANENCE IN DEDUPLICATED STORAGE CLOUDS

TECHNICAL FIELD

The present invention generally relates to cloud computing and, more particularly, to methods and systems for removing data remanence in deduplicated storage clouds.

BACKGROUND

Information technology is changing rapidly and now forms an invisible layer that increasingly touches nearly every aspect of business and social life. An emerging computer model known as cloud computing addresses the explosive growth of Internet-connected devices, and complements the increasing presence of technology in today's world. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Cloud computing is massively scalable, provides a superior user experience, and is characterized by new, Internet-driven economics. In one perspective, cloud computing involves storage and execution of business data inside a cloud which is a mesh of inter-connected data centers, computing units and storage systems spread across geographies.

With the advent of cloud computing, concepts such as storage clouds have emerged. The storage clouds are a huge network of storage which can be shared by the customers without the need for the customer to manage the storage infrastructure. The storage cloud provider usually has a single large storage space and the provider keeps data from all its customers at the same place, which leads to the concept of multi-tenancy and a multitenant environment. Usually this storage space is shared by the entire customer base on that cloud.

When a file is deleted, typically only a file pointer is deleted while the data blocks remain intact so there is a possibility of recovery of this data. Secure delete is an act of securely purging the content such that there are no remains on the storage. Secure delete is one of the vital aspects for data security over storage. Many regulatory compliances mandate the need for secure delete and there exits various standards for performing secure delete. Secure purging of data at the file level to meet secure delete requirements is the most common approach. Some of the delete operations over a file system can be extended to support different specifications of data remanence to implement secure delete. Data remanence involves multiple levels of writing with different formats depending upon the specification being implemented.

Data deduplication comprises a process to eliminate redundant data. In the deduplication process, duplicate data is deleted leaving only one copy of the data to be stored. In certain embodiments, indexing of all data is still retained should that data ever be required. Deduplication is able to reduce the effective storage capacity because only unique data is stored. Data deduplication can generally operate at the file or the data block level. File level deduplication eliminates duplicate files, but this is not a very efficient means of deduplication. Block deduplication looks within a file and saves unique iterations of each block or bit. Each chunk of data is processed using a hash algorithm such as MD5 (Message-Digest Algorithm) or SHA-1 (secure hash algorithm). This process generates a unique number for each piece which is then stored in an index. When a file is updated, only the changed data is saved. That is, when only a few bytes of a document or presentation are changed, only the changed blocks or bytes are saved and the changes do not constitute an entirely new file. Therefore, block deduplication saves more storage space than file deduplication.

Copy-on-write (COW) is an optimization strategy used in computer programming. The core idea is that if multiple users ask for files which are initially the same, they can all be given pointers to the same resource. This function can be maintained until a user tries to modify its 'copy' of the file, at which point a true private copy is created for that user to prevent the changes becoming visible to everyone else. All of this happens transparently to the users. The primary advantage is that if a user never makes any modifications, no private copy need ever be created.

It is possible in a cloud environment for a first user, e.g., customer A, to have a file which is deduplicated with another user, e.g., customer B. When customer A wants to securely delete the file, the system tries to securely delete the file by overwriting it with random data. In this case, deduplication uses the COW method, i.e., creating a new copy of the file in the file system and then applying the secure delete algorithm on this copy of the file. Effectively the original file remains untouched and the new copy of file gets securely deleted by the secure delete algorithm. As such, secure deletion in a multitenant environment may not actually securely delete the original file even though the customer believes the file is being securely deleted.

SUMMARY

In a first aspect of the invention, a method includes receiving from a local computing device a request to securely delete a file. The method also includes determining the file is deduplicated. The method further includes determining one of: the file is referred to by at least one other file, and the file is not referred to by another file. The method additionally includes securely deleting links associating the file with the local computing device without deleting the file when the file is referred to by at least one other file. The method also includes securely deleting the file when the file is not referred to by another file.

In another aspect of the invention, a system is implemented in hardware and includes a computer infrastructure operable to: receive, from a user, a request to securely delete a file; determine the file is a deduplicated file by analyzing a deduplication database; determine one of: the deduplicated file is referred to by at least one other file, and the deduplicated file is not referred to by another file; when the deduplicated file is referred to by at least one other file, securely delete links associating the deduplicated file with the user without deleting the deduplicated file; and when the file is not referred to by another file, securely delete the deduplicated file.

In an additional aspect of the invention, a computer program product includes a computer usable tangible storage medium having readable program code embodied in the tangible storage medium, the computer program product includes at least one component operable to: receive a first request to securely delete a deduplicated file, wherein the first request is received from a first user, and the first user and a second user are linked to the deduplicated file by data in a deduplication database; based on the first request, securely delete data from the deduplication database linking the first user to the deduplicated file, without deleting the deduplicated file; receive a second request to securely delete the deduplicated file, wherein the second request is received from the second user; and securely delete the deduplicated file based on the second request.

In a further aspect of the invention, a method of securely deleting deduplicated files in a multitenant environment includes providing a computer infrastructure being operable to: receive a request from a user to securely delete a deduplicated file; when more than one user is linked to the file, securely delete data linking the user to the file without deleting the file; and when only the user is linked to the file, securely delete the file.

In another aspect of the invention, a computer system for securely deleting deduplicated files in a multitenant environment includes a CPU, a computer readable memory and a computer readable storage media. The system includes first program instructions to receive a request from a user to securely delete a deduplicated file. The system includes second program instructions to securely delete data linking the user to the file without deleting the file when more than one user is linked to the file in a deduplication database. The system includes third program instructions to securely delete the file when only the user is linked to the file in the deduplication database. The first, second, and third program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to cloud computing and, more particularly, to methods and systems for removing data remanence in deduplicated storage clouds. Implementations of the invention provide a secure delete mechanism usable with deduplicated files. In accordance with aspects of the invention, the data deduplication process is enhanced by incorporating techniques for removing data remanence, the requirements of which often vary between users owning deduplicated data. In embodiments, a user is permitted to selectively designate a file as eligible or not eligible for data deduplication. In further embodiments, data remanence is removed when one of a plurality of users referencing a deduplicated file requests secure delete of the file. In additional embodiments, a strongest of at least two secure delete algorithms is determined and applied when a user requests a secure delete of a deduplicated file.

In accordance with aspects of the invention, secure delete requests of deduplicated files are handled based on the number of files that are deduplicated to a master copy of the file. In embodiments, when there are plural files (e.g., from plural users) deduplicated to a master copy and one of the users requests a secure delete, the system securely deletes the reference link blocks of the file associated with the user requesting the secure delete. In this manner, the master copy is not deleted while all links between the particular user and the file (e.g., data remanence) are deleted, such that there is no indication that the file is (or ever was) associated with the user requesting the secure delete. This permits other users to keep using the deduplicated file while providing a secure delete from the point of view of the user who requested the secure delete. On the other hand, when there is only one user linked to a master copy of a deduplicated file (e.g., after all other user links have been deleted) and that user requests a secure delete, the system and method securely deletes the master copy and all links of the user to the file. In this manner, implementations of the invention advantageously provide a secure delete methodology that works within the data deduplication multi-tenant environment.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
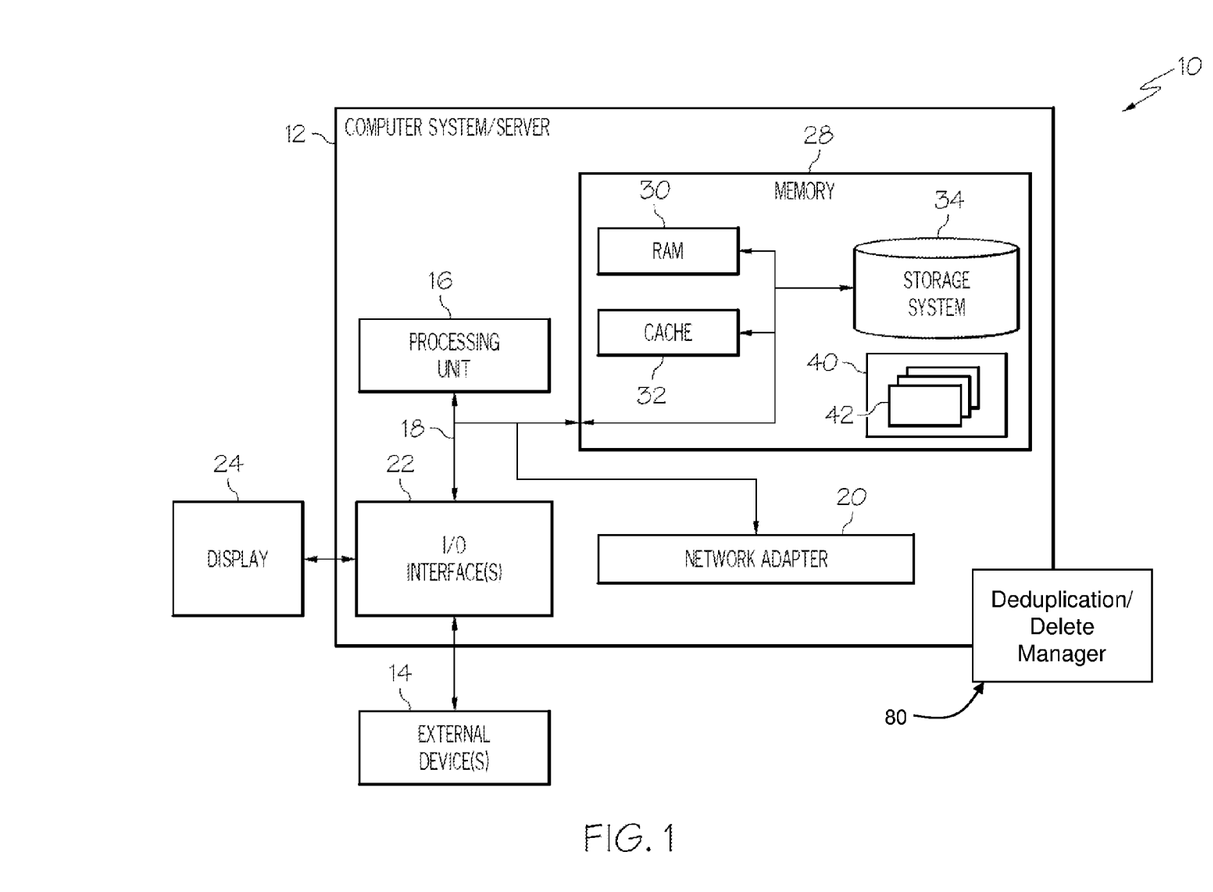
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. FIG. 1 can also represent a computing infrastructure capable of performing and/or implementing tasks and/or functions of the methods described herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a deduplication/delete manager 80 as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of the deduplication/delete manager 80 may be implemented as one or more of the program modules 42. Additionally, the deduplication/delete manager 80 may be implemented as separate dedicated processors or a single or several processors to provide the functionality described herein. In embodiments, the deduplication/delete manager 80 performs one or more of the processes described herein, including but not limited to: permit a user to selectively designate as file as eligible (or not eligible) for data deduplication; perform data deduplication processes; securely delete user links (e.g., removing data remanence) to a deduplicated file when a user requests a secure delete of the file when the master copy of the file is referenced by other users; securely delete a master copy of a deduplicated file when the last linked user requests a secure delete; and determine and apply a stronger one of at least two secure delete algorithms when a secure delete is requested.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
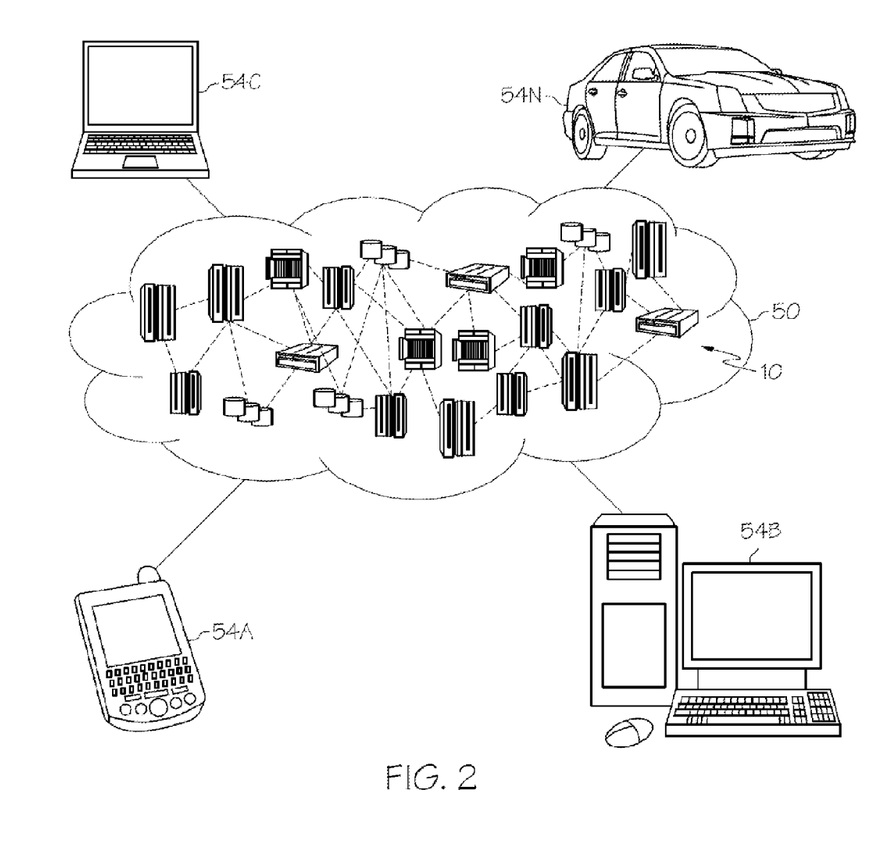
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
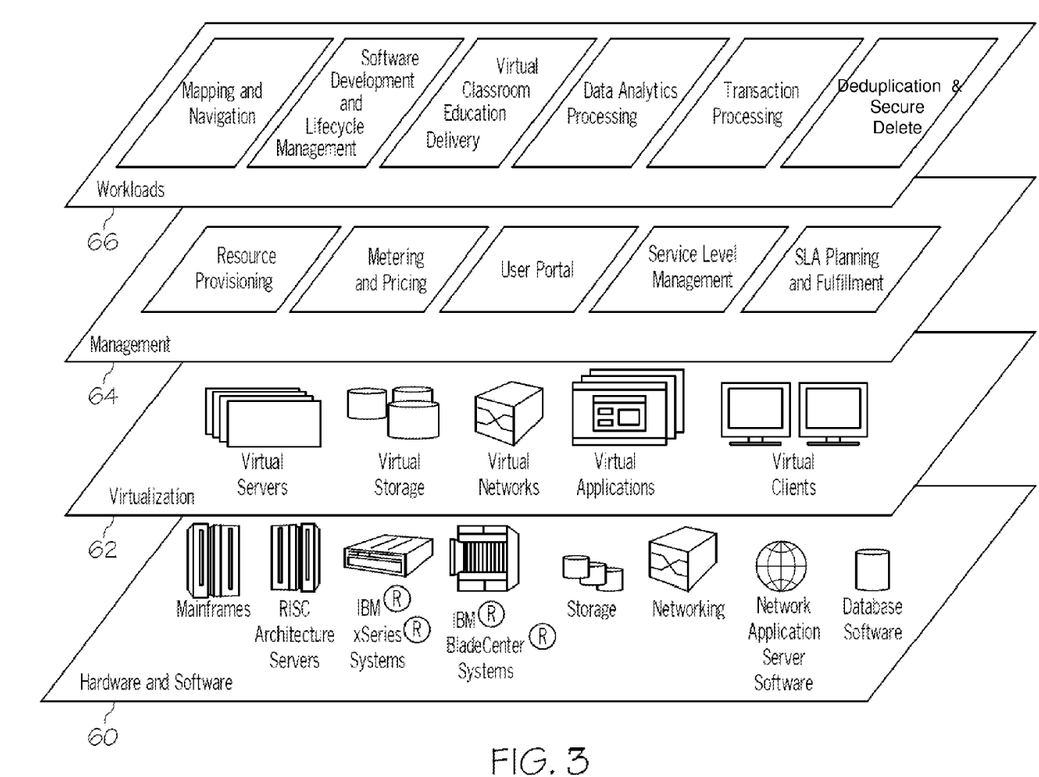
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and deduplication and secure delete. In accordance with aspects of the invention, the deduplication and secure delete workload/function operates to perform one or more of the processes described herein, including but not limited to: permit a user to selectively designate as file as eligible (or not eligible) for data deduplication; perform data deduplication processes; securely delete user links (e.g., removing data remanence) to a deduplicated file when a user requests a secure delete of the file when the master copy of the file is referenced by other users; securely delete a master copy of a deduplicated file when the last linked user requests a secure delete; and determine and apply a stronger one of at least two secure delete algorithms when a secure delete is requested.

As will be appreciated by one skilled in the art, aspects of the present invention, including the deduplication/delete manager 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
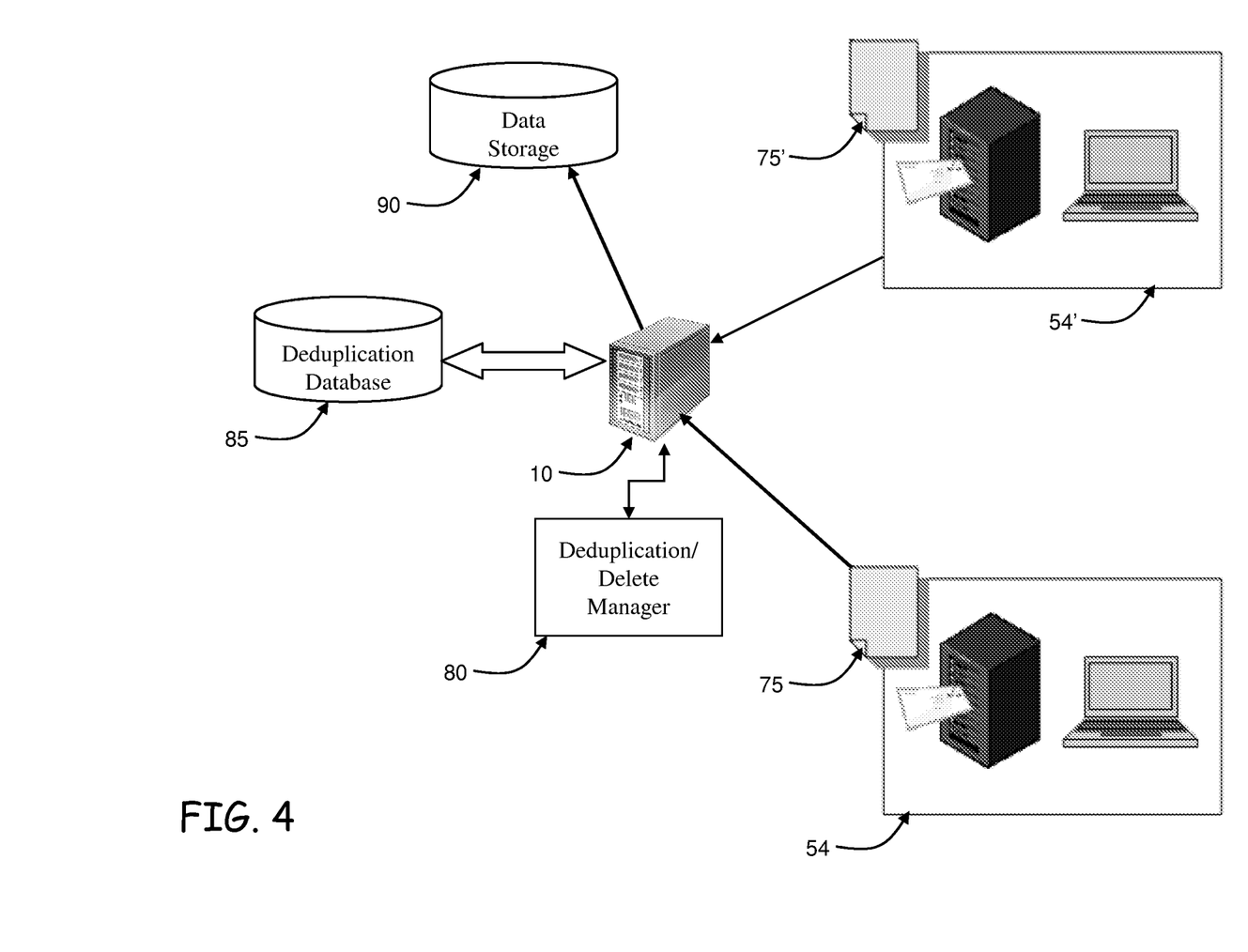
FIG. 4 depicts a data deduplication block diagram.

FIG. 4 depicts a deduplication block diagram in accordance with aspects of the invention. In embodiments, data 75, 75' flows from one or more local computing devices 54, 54' to a deduplication system comprising computing node 10 and deduplication/delete manager 80. The local computing devices 54, 54' may be one of many local computing devices 54A-N described above with respect to FIG. 2. In a block deduplication process, the deduplication/delete manager 80 takes each block of the data 75, 75' and runs a hash algorithm that generates a unique key for each block. The deduplication/delete manager 80 compares the unique key for each block to keys stored in a deduplication database 85, e.g., by looking up the unique key for each block in the deduplication database 85 to determine if the key already exists (which indicates that the particular block of data has been previously written). When the block has not been written previously (e.g., there is no match to the unique key in the deduplication database 85), the deduplication/delete manager 80 writes the block to storage 90 and the unique key for the block is written to the deduplication database 85. The storage 90 may comprise, for example, a storage node in the cloud as depicted in FIG. 2. On the other hand, when the block has been written previously (e.g., there is a match to the unique key in the deduplication database 85), the deduplication/delete manager 80 writes a pointer that points to the location of the original copy of the block.

As depicted in FIG. 4, more than one user may be associated with a deduplicated file. For example, first and second local computing devices 54 and 54' may both reference the deduplicated file that is saved in data storage 90. In embodiments, data defining a link between a particular user (e.g., local computing device 54 or 54') and a file (or one or more blocks of the file) is stored in deduplication database 85. As described in greater detail herein, when a deduplicated file is referenced by at least two users (e.g., devices 54 and 54', or referred to by files associated with the devices) and one of the users (e.g., device 54') requests a secure delete of the file, the data in the deduplication database 85 defining the link between the requesting user and the file is deleted. In this manner, any data remanence associated with the requesting user (e.g., device 54') and the deduplicated file is deleted, such that the requesting user performs a secure delete from their point of view. Additionally, although the requesting user is disassociated with the file, remaining users (e.g., device 54) still have access to the deduplicated file since the master copy of the file saved in data storage 90 is not deleted until a last remaining user requests secure deletion of the file.

In accordance with additional aspects of the invention, the deduplication database 85 also stores data defining a particular secure delete algorithm associated with a deduplicated file. In embodiments, the deduplication database 85 and/or the deduplication/delete manager 80 stores a graded list of secure delete algorithms. Any suitable secure delete algorithms may be sued within the scope of the invention, including conventional secure delete algorithms (e.g., the Gutmann method, US DoD 5220.22-M, RCMP TSSIT OPS-II, etc.) and/or later developed secure delete algorithms. For example, the relative strengths of a plurality of secure delete algorithms may be pre-defined (e.g., using any desired quantitative and/or qualitative measure) and stored in the graded list of secure delete algorithms.

In embodiments, one of the graded algorithms is assigned to the deduplicated file either automatically by the system or by a user. For example, the deduplication/delete manager 80 may present the list to a user when the user is saving the file, in which case the user selects one of the algorithms from the list. In another example, the deduplication database 85 and/or the deduplication/delete manager 80 may be programmed to automatically assign one of the algorithms from the list to a file based on any combination of parameters, such as: file type, file extension, user identity (e.g., MAC address, IP address, username, etc.), etc. In either event, the deduplication/delete manager 80 saves data defining the secure delete algorithm associated with the file in the deduplication database 85, e.g., as a field associated with the file in the deduplication database 85.

In embodiments, when a user requests a secure delete of a deduplicated file, the user may also designate a secure delete algorithm to use in the secure delete process. The user-designated secure delete algorithm may be from the same graded list that is saved at the deduplication database 85 and/or the deduplication/delete manager 80. The user designation may be automatic (e.g., pre-defined and saved for this user) or user-selected (e.g., from a list presented to the user by the deduplication/delete manager 80 at the time of the request for secure delete). In embodiments, upon receiving the request for secure delete, the deduplication/delete manager 80 compares the user-designated secure delete algorithm to the secure delete algorithm defined in the deduplication database 85 as associated with the file, and uses the stronger of the two secure delete algorithms for performing the requested secure delete.

Figure 5:
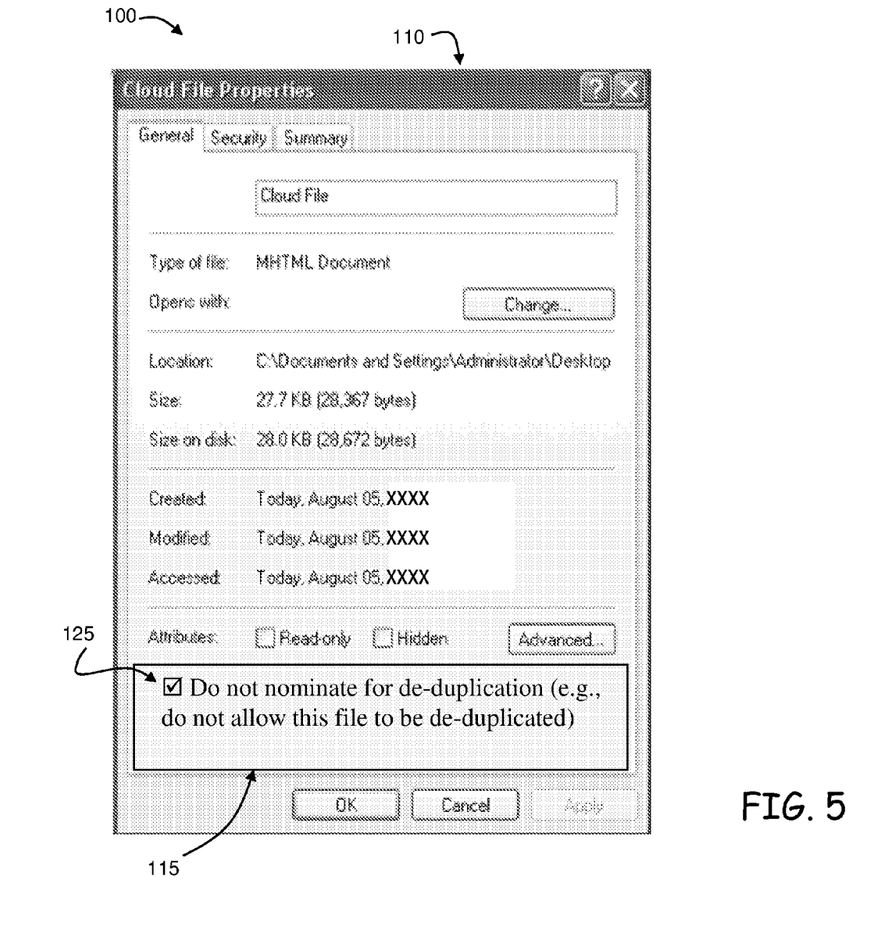
FIG. 5 depicts an exemplary user interface and associated functionality in accordance with aspects of the invention.

FIG. 5 depicts an exemplary user interface 100 and associated functionality in accordance with aspects of the invention. In embodiments, the interface 100 includes a properties window 110 that is presented on a local computing device, e.g., local computing device 54. The interface 100 may be presented on the local computing device in response to the user performing a prescribed pattern of mouse clicks, keystrokes, touch-screen selections, etc. As but one of many possible examples, the interface 100 may be presented when the user selects an existing file, right-clicks the mouse pointer on the selected file, and selects "Properties" from a menu. Additionally or alternatively, the interface 100 may be automatically presented to the user on the local computing device when a file is being saved.

According to aspects of the invention, the interface 100 comprises a deduplication selection portion 115 that includes at least one selectable field 125, such as a user-selectable check-box, that permits a user to designate whether this file is eligible (or not) for data deduplication. There are situations, such as when dealing with classified and/or confidential material, when a user may desire to prevent a file from being deduplicated with another file. In this manner, the interface 100 with selectable field 125 provides a user with the ability to make a deduplication designation for any given file. In embodiments, the deduplication designation is saved as a file attribute that can be analyzed by the deduplication/delete manager 80 for determining whether to apply data deduplication process to a file, e.g., as shown in FIG. 4.

The interface 100 is merely exemplary and is not intended to be the only manner of presenting the user with the ability to selectively designate a particular file as being either eligible or not eligible for deduplication. Any suitable interface may be employed within the scope of the invention for presenting such functionality to the user on the local computing device.

Flow Diagram

Figure 6:
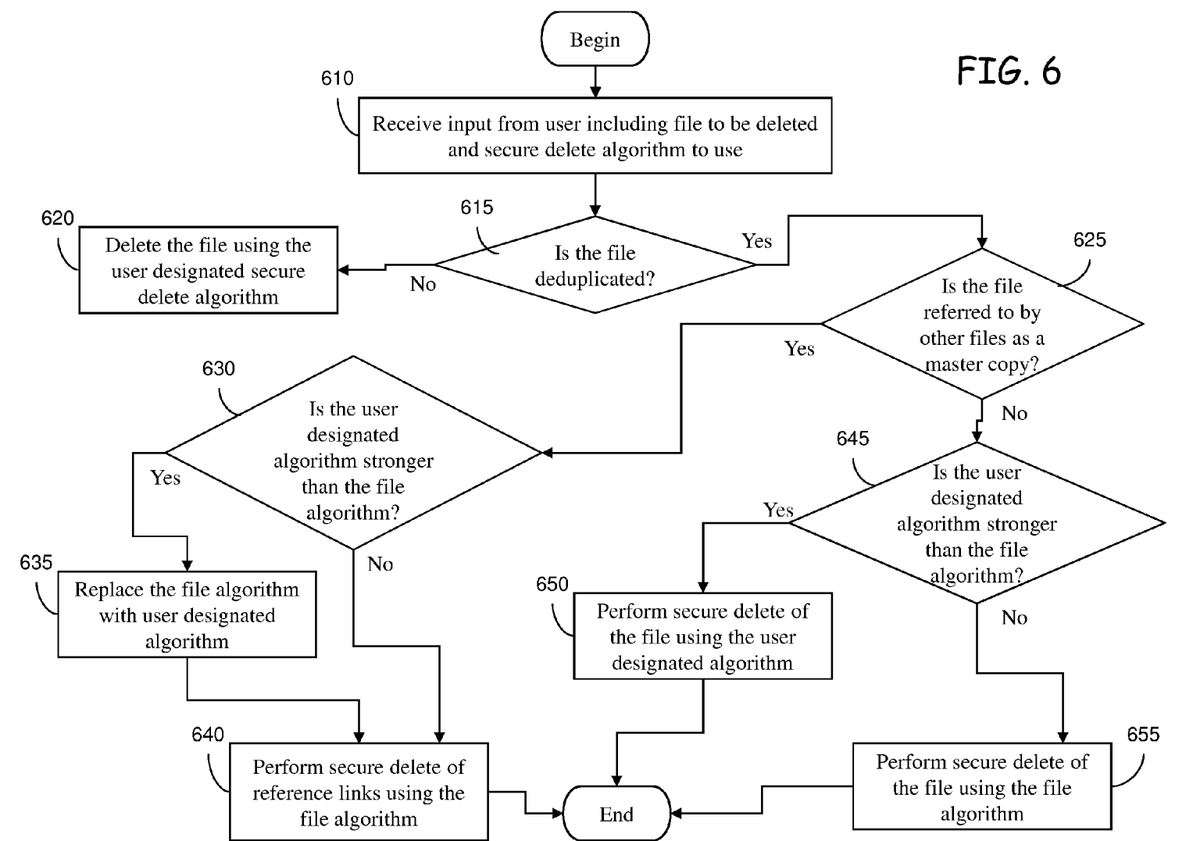
FIG. 6 depicts an exemplary flow diagram in accordance with aspects of the invention.

FIG. 6 shows an exemplary flow for performing aspects of the present invention. The steps of FIG. 6 may be implemented in any of the environments of FIGS. 1-4, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 6 depicts an exemplary flow for a process in accordance with aspects of the present invention. At step 610, a secure delete and deduplication system (e.g., a computing device running the deduplication/delete manager 80) receives input from the user (e.g., local computing device), the input comprising a request to secure delete a file and a designation of a secure delete algorithm to use when deleting the file. Step 610 may comprise the secure delete and deduplication system receiving a request from a user to delete the file, presenting the user with a list of secure delete algorithms from which to choose, and receiving from the user a designation of the one of the list of secure delete algorithms.

At step 615, the secure delete and deduplication system determines whether the file requested at step 610 is deduplicated. This may be performed, for example, by examining the deduplication database 85 for an entry corresponding to the requested file. When it is determined at step 615 that the file is not deduplicated, then at step 620 the secure delete and deduplication system deletes the file using the secure delete algorithm designated in the user input from step 610. The deleting the file may comprise at least one of: deleting the copy of the file, deleting all pointers to the file, writing random data over the location of the file, deleting data remanence, and any other actions prescribed by the designated secure delete algorithm.

On the other hand, when it is determined at step 615 that the file is deduplicated, then at step 625, the secure delete and deduplication system determines whether the file is referred to by any other files or users as a master copy (e.g., whether the file is linked to any other users). In embodiments, the secure delete and deduplication system makes this determination by analyzing data in the deduplication database to determine whether there is a reference link with which another file or user is pointing to the file.

The process proceeds to step 630 when it is determined at step 625 that the file requested for deletion is referred to as a master copy, e.g., another file or user is linked to this deduplicated file. At step 630, the secure delete and deduplication system determines whether the user designated secure delete algorithm (e.g., from step 610) is stronger than the secure delete algorithm associated with the file (e.g., the file algorithm as defined by data associated with the file in the deduplication database). In embodiments, the secure delete and deduplication system compares the relative strengths of the two secure delete algorithms, e.g., by determining which of the two secure delete algorithms is higher in the graded list, or by using any other suitable predefined quantitative and/or qualitative measure of the relative strengths of the secure delete algorithms.

When it is determined at step 630 that the user designated secure delete algorithm (e.g., from step 610) is stronger than the file algorithm, then at step 635, the secure delete and deduplication system replaces the file algorithm with the user designated secure delete algorithm. This may be performed, for example, by overwriting data in the deduplication database defining which secure delete algorithm is associated with the deduplicated file. The process then proceeds to step 640, where the secure delete and deduplication system securely deletes the reference links associating the user with the file using the file algorithm, which is now the same as the user designated secure delete algorithm by virtue of the replacing at step 635. Alternatively, when it is determined at step 630 that the file algorithm is stronger than the user designated secure delete algorithm (e.g., from step 610), then the process proceeds directly to step 640, at which point the secure delete and deduplication system securely deletes the reference links associating the user with the file using the file algorithm.

In accordance with aspects of the invention, the deletion of links at step 640 comprises deleting all data in the deduplication database that defines an association between the user requesting deletion (e.g., from step 610) and the deduplicated file, without deleting the master copy of the deduplicated file. In this manner, the user requesting secure deletion is entirely dissociated with the deduplicated file in the sense that all links between the user and the file are deleted using the secure delete algorithm, thus ensuring that there is no data remanence linking the user to the deduplicated file. Thus, from the standpoint of the user requesting deletion, a secure delete has been performed. However, the master copy of the file is not deleted since one or more other files or users are still referencing the deduplicated file.

Referring back to step 625, when the file requested for deletion is not referred to by any other users as a master copy, then it can be said that the user requesting deletion is the only user linked to the deduplicated file, and the process proceeds to step 645. This may be the case, for example, where one or more other users have already securely deleted their links to the deduplicated file (e.g., via step 640), leaving the user now requesting deletion as the sole user still linked to the deduplicated file.

At step 645, the secure delete and deduplication system determines whether the secure delete algorithm designated by the user requesting the secure delete (e.g., from step 610) is stronger than the file algorithm (e.g., as defined in the deduplication database for this particular file). This may be performed in a manner similar to step 630. When the user designated secure delete algorithm is stronger than the file algorithm, then at step 650 the system employs the user designated secure delete algorithm to securely delete the file (e.g., from data storage 90) and all links of the user to the file in the deduplication database (e.g., similar to step 640). On the other hand, when the file algorithm is stronger than the user designated secure delete algorithm, then at step 655 the system employs the file algorithm to securely delete the file (e.g., from data storage 90) and all links of the user to the file in the deduplication database (e.g., similar to step 640). In this manner, the master copy of the file and all data remanence are securely deleted.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed:

1. A computer program product comprising a computer usable tangible storage medium having readable program code embodied in the tangible storage medium, wherein the tangible storage medium comprises a device and the computer program product includes at least one component operable to:
   receive a first request to securely delete a deduplicated file, wherein the first request is received from a first user, and the first user and a second user are linked to the deduplicated file by data in a deduplication database;
   based on the first request, securely delete data from the deduplication database linking the first user to the deduplicated file, without deleting the deduplicated file;
   receive a second request to securely delete the deduplicated file, wherein the second request is received from the second user; and
   securely delete the deduplicated file based on the second request.

2. The computer program product of claim 1, wherein:
   the first request includes a first user designated secure delete algorithm;
   the second request includes a second user designated secure delete algorithm;
   the second request occurs after the first request; and
   the data deduplication database includes a field associated with the deduplicated file and defining another secure delete algorithm.

3. The computer program product of claim 2, wherein the at least one component is further operable to:
   compare relative strengths of the first user designated secure delete algorithm and the other secure delete algorithm and, based upon the comparing, perform the securely deleting data from the deduplication database linking the first user to the deduplicated file using a stronger one of the first user designated secure delete algorithm and the other secure delete algorithm; and
   compare relative strengths of the second user designated secure delete algorithm and the other secure delete algorithm and, based upon the comparing, perform the securely deleting the deduplicated file using a stronger one of the second user designated secure delete algorithm and the other secure delete algorithm.

* * * * *